United States Patent [19]
Nguyen

[11] Patent Number: 5,945,817
[45] Date of Patent: Aug. 31, 1999

[54] INTEGRATED CIRCUIT POWER STATUS INDICATOR AND METHOD OF USING THE SAME

[75] Inventor: Don J. Nguyen, Portland, Oreg.

[73] Assignee: Intel Corporation, Santa Clara, Calif.

[21] Appl. No.: 09/085,331

[22] Filed: May 26, 1998

[51] Int. Cl.[6] .................................................. G05F 1/56
[52] U.S. Cl. ........................................................ 323/273
[58] Field of Search ..................... 323/273, 283; 363/56; 361/28; 320/DIG. 21, 106; 324/426, 427, 433; 364/483

[56] References Cited

U.S. PATENT DOCUMENTS

| | | | |
|---|---|---|---|
| 5,136,223 | 8/1992 | Karakama et al. | 318/573 |
| 5,268,845 | 12/1993 | Startup et al. | 364/483 |
| 5,475,295 | 12/1995 | Hong | 320/43 |
| 5,485,363 | 1/1996 | Reitwiesner | 363/56 |

*Primary Examiner*—Adolf Deneke Berhane
*Attorney, Agent, or Firm*—Jeffrey S. Draeger

[57] ABSTRACT

A power status indicator and method of using the same. An apparatus utilizing a power status signal includes a circuit and a variable voltage supply. The circuit is capable of generating a power status signal indicating a power consumption mode in which the circuit operates. The variable voltage supply is coupled to receive the power status signal and to provide the circuit with a supply voltage which is a function of the power status signal.

24 Claims, 8 Drawing Sheets

INTEGRATED CIRCUIT POWER STATUS INDICATOR AND METHOD OF USING THE SAME

BACKGROUND OF THE INVENTION

1. Field of the Invention

The present invention pertains to integrated circuits and power supplies therefore. More particularly, the present invention pertains to the use of a power status signal to adjust the voltage supplied to and/or received by an integrated circuit or a portion thereof.

2. Description of Related Art

Improved power supplies for integrated circuits may ultimately improve integrated circuit manufacturing yield. The yield represents a percentage of integrated circuits produced which perform within the specified parameters, a percentage which may be improved if a power supply can limit the voltage supplied to the integrated circuit to a smaller operating range. The smaller operating range allows, for instance, the average or nominal voltage supply value to be set higher without causing the upper end of the operating range to exceed the highest allowable voltage for the integrated circuit (as determined by power constraints or otherwise).

Since transistors generally operate faster with a higher supply voltage, setting the nominal supply value higher may be quite advantageous. The result is that a larger percentage of integrated circuits will achieve target timing specifications due to the higher voltage. Thus, a more tightly controlled output voltage (i.e., a smaller output voltage range) may allow the integrated circuit to more easily meet timing specifications, thereby improving manufacturing yield.

A simple model of a prior art voltage supply includes a voltage source, an equivalent series inductance (ESL) in series with the voltage supply, and an equivalent series resistance (ESR) in series with a capacitor that is parallel to the voltage supply. The ESL and ESR components reflect the reality that no power supply can instantaneously respond to every possible change in load. When a dramatic decrease in current demand occurs, the ESL effectively continues driving current through the load, thus causing a voltage bounce. Similarly, when a large increase in current demand occurs, the ESR resists the immediate increase in current, causing a voltage droop. The output voltage returns to a steady state in a period determined mostly by the ESL and ESR values.

Coping with dramatic changes in current demand has become increasingly important in computer systems because various components may be shut down from time to time due to inactivity or for other reasons. For example, a particular unit of a processor or the entire processor may be shut down when not in use. Typically, a processor switches between high and low power consumption modes very quickly, perhaps in a single clock cycle. This dramatic and rapid change can produce the previously mentioned voltage bounce or droop.

These sudden voltage swings complicate the task of maintaining a supply voltage within a specified operating voltage for the component. The difficulty of maintaining a narrow voltage range is exacerbated by the increasing power consumption of such integrated circuits, and the larger current changes which occur when such integrated circuits switch between power consumption modes. Additionally, as new technology allows integrated circuits to operate at lower and lower voltages, the operating voltage range inevitably must shrink.

According to the prior art, a voltage supply may be kept within an acceptable range by utilizing components which provide a smaller ESL and a smaller ESR. This prior art technique which attempts to limit the ESL and ESR to produce a tighter voltage output range may prove inadequate to achieve a sufficiently narrow operating voltage in view of the larger abrupt current changes expected as integrated circuit technology advances. Moreover, even if a very narrow operating voltage range is not required to operate a particular circuit, it may be useful in improving yield and/or reducing power consumption. The prior art lacks an adequate mechanism to maintain a narrow supply voltage range for a circuit by considering the mode in which the circuit is operating.

SUMMARY

A power status indicator and method of using the same is disclosed. An apparatus utilizing a power status signal includes a circuit and a variable voltage supply. The circuit is capable of generating a power status signal indicating a power consumption mode in which the circuit operates. The variable voltage supply is coupled to receive the power status signal and to provide the circuit with a supply voltage which is a function of the power status signal.

BRIEF DESCRIPTION OF THE FIGURES

The present invention is illustrated by way of example and not limitation in the figures of the accompanying drawings.

DETAILED DESCRIPTION

The following description provides an integrated circuit power status indicator and method of using the same. In the following description, numerous specific details such as signal polarities, signal representations, power supply implementations, and logic partitioning choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The disclosed techniques provide an intelligent mechanism for adjusting a power supply voltage for a circuit based on a power consumption mode of the circuit. For example, in one embodiment, the supply voltage is driven to a low supply voltage after the circuit enters a high power mode but before the supply voltage recovers from a droop caused when the circuit enters the high power consumption mode. In a complementary fashion, this embodiment may then drive the supply voltage to a high supply voltage level after the circuit enters a low power mode but before the voltage supply recovers from a bounce caused when the circuit enters a low power consumption mode.

By dynamically adjusting the supply voltage, some embodiments provide improved control over the supply voltage in that a smaller operating range is achieved. As will be further discussed below, such a smaller operating range may result in improved manufacturing yield for the circuit receiving the dynamically adjusted supply voltage. Additionally, overall power consumption of a circuit may be reduced significantly because a lower voltage is supplied to the circuit when the circuit operates in a high power mode.

Figure 1:
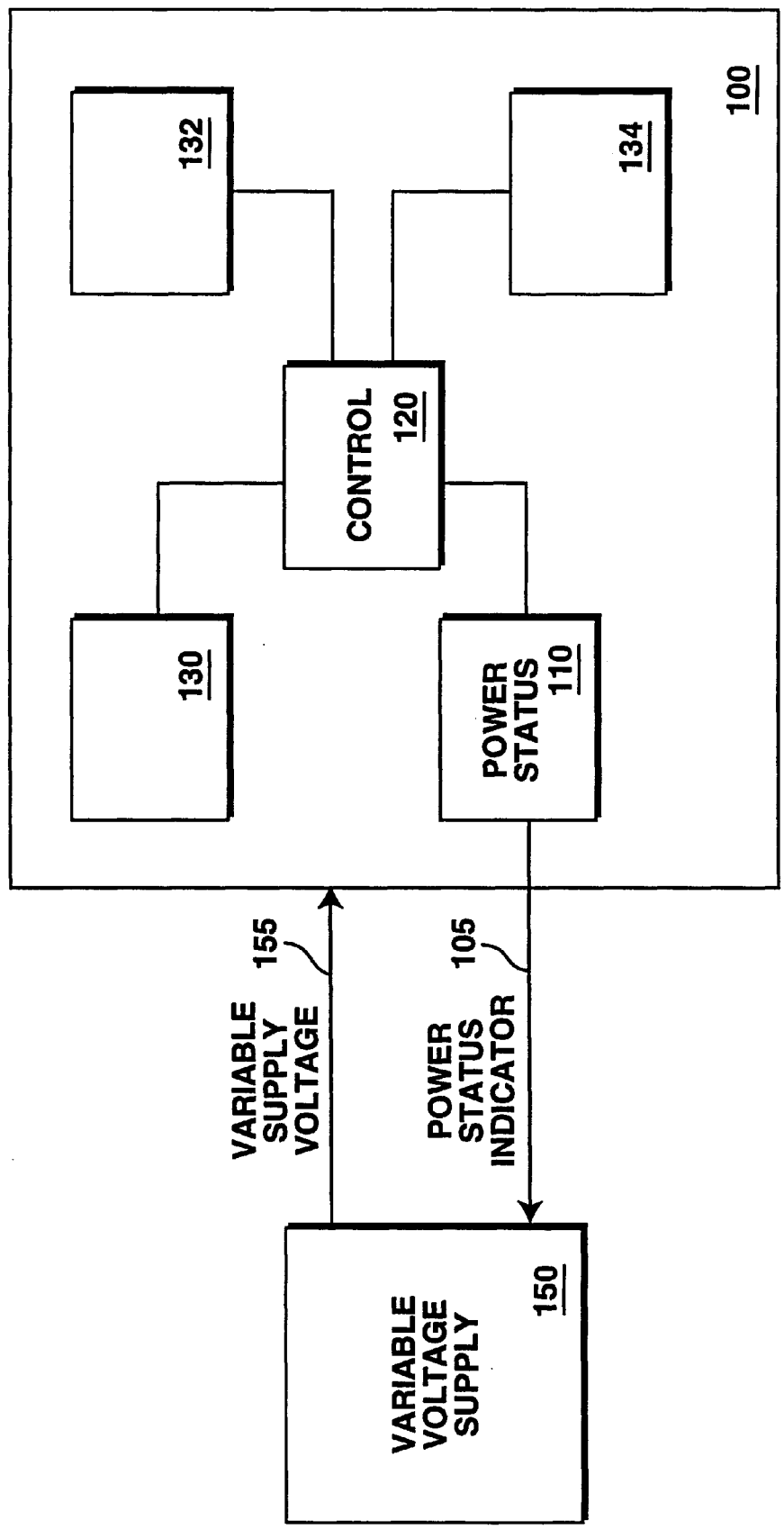
FIG. 1 illustrates one embodiment of a circuit powered by a variable voltage supply that adjusts its supply voltage based on a power status indicator from the circuit.

FIG. 1 illustrates one embodiment of a circuit 100 which is powered by a variable voltage supply 150. The circuit 100 may be a single integrated circuit component including but not limited to a processor, a bus bridge, or a graphics accelerator. Alternatively, the circuit 100 may be a portion of an integrated circuit or even several integrated circuits. In any case, the circuit 100 generates a power status indicator (also referred to as a power status signal) on a signal line 105. The variable voltage supply 150 provides a variable supply voltage on power supply line 155 which is a function of the power status signal. The variable supply voltage is a function of the power status indicator in that the variable voltage supply 150 adjusts the variable supply voltage in response to changes in the power status indicator.

The circuit 100 includes a plurality of functional units 130, 132, and 134, which are coupled to and controlled by a control unit 120. The control unit 120 is capable of operating the various functional units in at least two power consumption modes. For example, the control unit 120 may shut down (e.g., by turning off the clocks to) the functional unit 130. The control unit 120 may also shut down any combination of the functional units, or may allow various levels of power consumption for one or more of the functional units. Many possibilities exist; however, so long as the circuit 100, as a whole, has at least two power consumption modes, the variable voltage supply 150 can adjust the supply voltage based on the power status indicator.

The control unit 120 is coupled to communicate power consumption modes to a power status generator 110. In one embodiment, the control circuit 120 and the power status generator 110 cooperate to provide the variable voltage supply 150 with the current (i.e., present) power consumption mode of the circuit 100 such that the variable voltage supply 150 adjusts after the change in current demand occurs. In alternative embodiments, the control circuit 120 may provide an early indication of when the circuit 100 is going to switch into a different power consumption mode, thereby allowing variable voltage supply 150 to adjust in advance to compensate for an expected change in current consumption.

Figure 2:
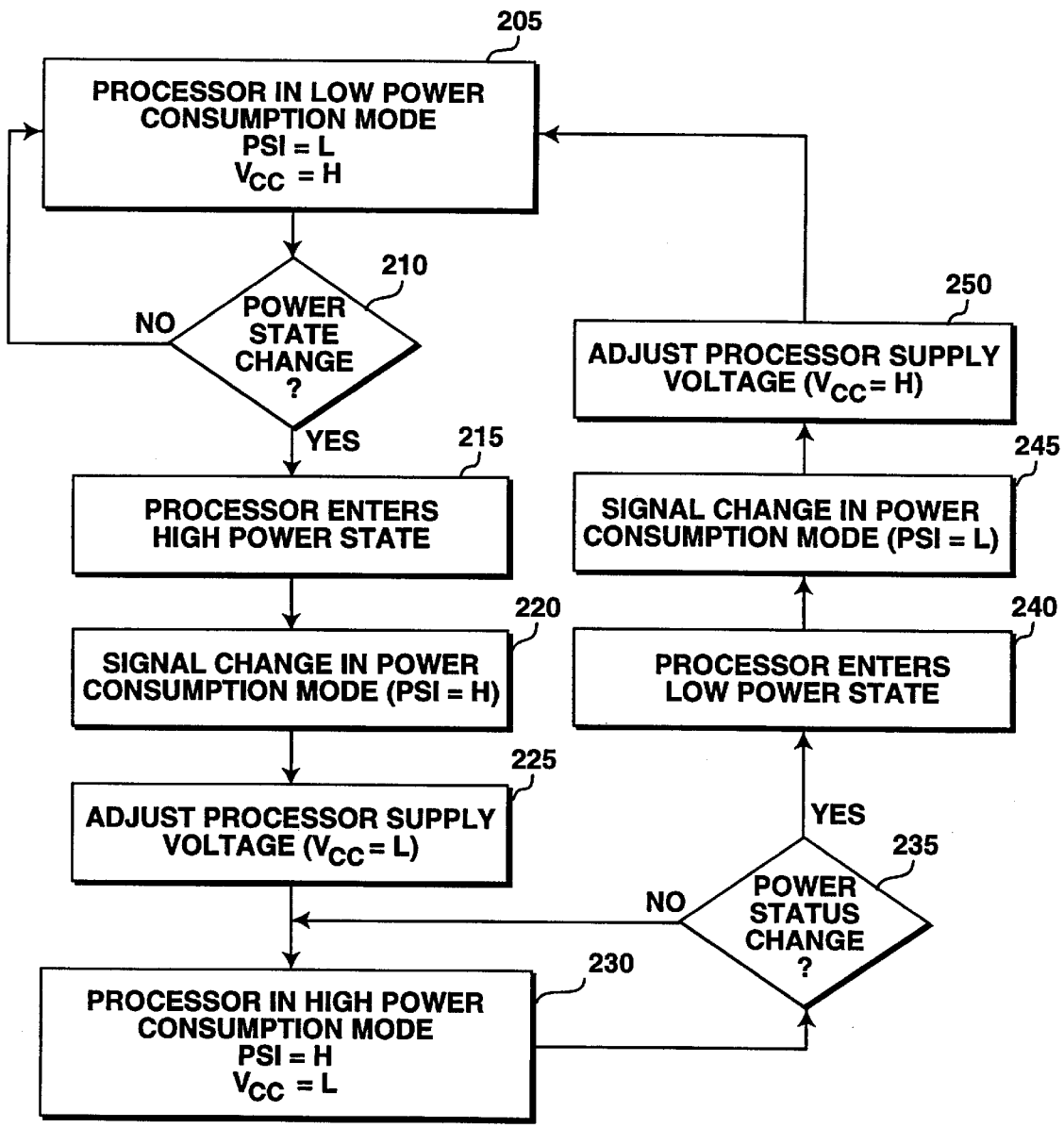
FIG. 2 illustrates one embodiment of a method of providing a supply voltage which is a function of a power status indicator.
Figure 3:
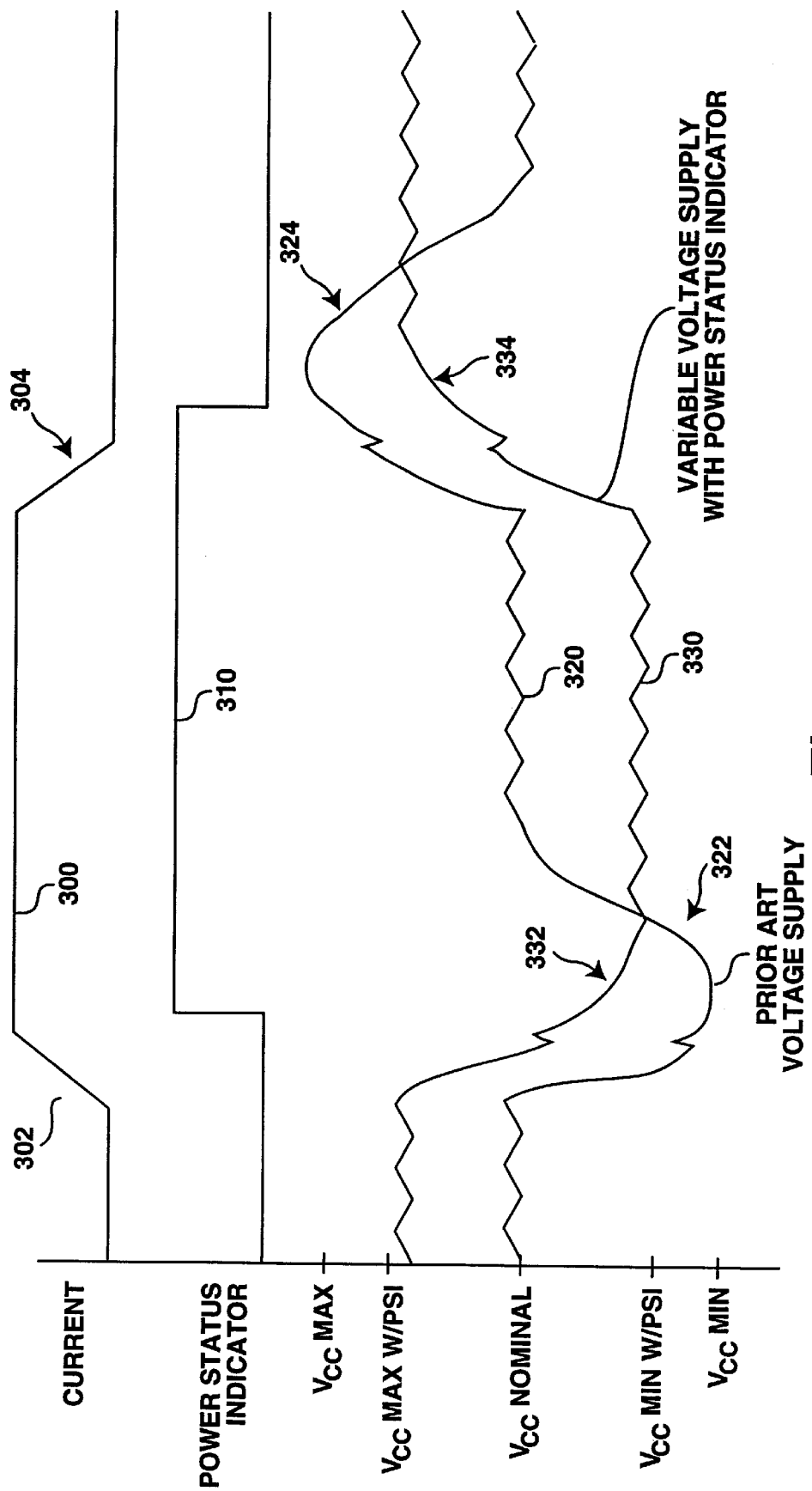
FIG. 3 illustrates waveforms contrasting output voltages for a prior art power supply and a power supply utilizing disclosed techniques to set the supply voltage.

FIG. 2 illustrates one embodiment of method in which the current power consumption mode of a processor is signaled to a variable voltage supply for the processor. FIG. 3 illustrates the waveforms resulting from operation according to the method of FIG. 2. As shown in block 205, when the processor is in a lower power consumption mode, the power status indicator (PSI) is set to a low logic level. At this point, the supply voltage to the processor (Vcc) is set to a high voltage level.

As shown by waveform 320 in FIG. 3, a prior art voltage supply typically operates at or close to a nominal voltage (Vcc nominal) during steady state operation, regardless of the mode of processor operation. As indicated by waveform 330, a power supply utilizing the power supply indicator, on the other hand, produces a supply voltage at a first voltage (Vcc MAX w/PSI) when the processor is in a low power consumption mode. In this embodiment the high voltage is high in that it is higher than the supply voltage provided when the processor is in the high power consumption mode.

As indicated by block 210, if there is no change in the power state (i.e., the power consumption mode), the processor remains in the low power consumption mode indicated by block 205. In the embodiment of FIG. 2, only two power consumption modes are available. Thus, if there is a change in the power consumption mode detected in block 210, the processor enters the high power consumption mode as shown in block 215.

When the processor enters the high power consumption mode, an increase in current to the processor occurs as indicated by a transition 302 in the current waveform 300. Both the prior art power supply waveform 320 and the variable voltage supply waveform 330 dip in response to the increased current demand. The prior art voltage supply waveform 320 dips to the minimum Vcc level (Vcc MIN) whereas the variable voltage supply waveform 330 began at a higher voltage and therefore does not dip so low. Additionally, the prior art voltage supply attempts to return its supply voltage to the nominal level and therefore drives the output voltage back up to the nominal level as indicated at point 322 on waveform 320.

The variable voltage supply utilizing the power status indicator, on the other hand, behaves differently. As indicated in block 220 and shown in waveform 310, the power status indicator changes in response to the change in power consumption mode. As a consequence, the processor supply voltage is adjusted to a low output voltage level as indicated in block 225. Thus, at point 332 in waveform 330, the supply voltage does not begin to rise back to the high level (Vcc MAX w/PSI) nor does the voltage transition to the nominal level (Vcc nominal). Rather, the voltage is maintained at the low voltage level (Vcc MIN w/PSI) while the processor remains in the high power consumption mode as indicated by block 230. Notably, the "low" voltage level for the supply voltage is not at or near ground as in the case of a logic signal at a low logic level. Rather the low supply voltage is within and perhaps close to the low end of an expected Vcc range for the circuit being powered.

The power status indicator should be generated such that the variable voltage supply can adjust its output voltage prior to the variable voltage supply recovering the the voltage excursion (e.g., in this case the voltage droop) caused by the change in current. In particular, in one embodiment, the variable voltage supply begins driving the voltage to the low voltage level at a point after the current transition 302 which is prior to the output reaching its minimum level (in this case Vcc MIN w/PSI). In other embodiments, the voltage may be driven to the low voltage level at other times. For instance, it may also be desirable to drive the voltage to the low voltage level at the time which it reaches the low voltage level due to the droop caused by the increased load.

Driving the voltage to Vcc MIN w/PSI at least before the recovery to a voltage above the steady state Vcc MIN w/PSI may help ensure that the supply voltage stays within a predetermined voltage range. If the supply voltage were allowed to rise above Vcc MIN w/PSI, another transition in current consumption could drive the voltage above Vcc MAX w/PSI, potentially enlarging the range of voltages supplied to the circuit. In other words, the most narrow voltage range may be achieved by ensuring that the supply voltage does not recover beyond Vcc MIN w/PSI; however, even if a voltage transient exceeds Vcc MIN w/PSI or recovery above Vcc MIN w/PSI does occur, the expected supply voltage range may expand as a result. Nonetheless, a more narrow supply range may still be available than when using prior art techniques.

Additionally, it should be noted that Vcc MIN w/PSI need not be set at the lowest level which the droop reaches, but rather could be set higher or lower depending on the specific requirement of the circuitry (e.g., the processor) involved. Therefore, the supply voltage may dip beyond the low voltage level to which it is eventually driven in a steady state condition when the circuit is in the high power consumption mode.

When another power status change occurs (block 235), the processor transitions to the low power state as indicated in block 240. This transition is indicated by a downward transition 304 in the current waveform 300. Both the prior art waveform 320 and the variable supply waveform 330 rise (bounce) in response to the reduction in current demand. The prior art waveform 320 rises to the level of Vcc MAX, whereas the variable voltage supply begins at the lower level of Vcc MIN w/PSI and therefore does not rise so high. Additionally, the prior art voltage supply drives its output voltage back to (or close to) the nominal level as indicated by the decreasing voltage at point 324 of the waveform 320.

The same timing concerns apply when the power status indicator transitions to the low level. Furthermore, the variable voltage supply may drive the supply voltage to the high voltage level at a time prior to the supply voltage reaching that high voltage level or at a later time. It may be appropriate to drive the supply voltage to Vcc MAX w/PSI after recovery begins so long as the supply voltage has not recovered by drooping towards the low voltage level such that a power consumption mode transition would cause the voltage to drop outside the voltage range required by the circuitry (e.g., the processor) involved.

In some cases, the processor may transition too rapidly between power consumption modes for the transient voltage excursions (i.e., the bounce and droop) to settle as well as too rapidly for the variable voltage supply to fully drive the supply voltage to its new level. In such cases, however, the remaining transient effects are typically due to the capacitive element in the voltage supply not reaching its steady state value. Consequently, the bounce or droop occurring due to the second transition may not cause as large of a transient effect. Accordingly, such rapid transitions may not expand the expected voltage range even though the supply voltage is unable to fully adjust between successive power consumption mode changes.

Again, the variable voltage supply utilizing the power status indicator behaves differently. As indicated in block 245 and shown in waveform 310, the power status indicator transitions low to indicate that the processor is in the low power consumption mode. The processor supply voltage is adjusted to a high output voltage level as indicated in block 250, and the voltage supplied remains at or continues its transition to the high voltage level Vcc MAX w/PSI after point 334 of the waveform 330.

As can be seen from the waveforms in FIG. 3, the supply voltage from the variable voltage supply utilizing the power status indicator is maintained in a more narrow operating range than the prior art voltage supply. The narrower range results from the fact that the variable voltage supply adjusts its output voltage based on the current power consumption mode to a level which at least partially compensates for the bounce or droop which will be caused by the next change in power consumption mode. For example, when the processor is in the low power consumption mode, the supply voltage is high. When the voltage droops due to the transition to the high power consumption mode, the supply voltage begins its droop at a higher voltage and therefore stays within a smaller voltage range despite the fact that the magnitude of the droop may be the same as occurs with the prior art supply.

This narrower operating range may be particularly advantageous in the typical case where there is a maximum limit on the voltage which may be applied for recommended operation of an integrated circuit such as a processor. For example, a processor may not be able to exceed Vcc MAX on FIG. 3 due to power consumption limits. With the prior art power supply, the supply specification would provide that the range from Vcc MIN to Vcc MAX is acceptable. As such, the processor would have to properly function within the range of Vcc MIN to Vcc MAX. Due to the fact that integrated circuits generally operate slower at lower voltages, a certain percentage of parts would fail for not meeting timing specifications when tested at the Vcc MIN level.

With the variable voltage supply utilizing the power status indicator, the Vcc MIN w/PSI is higher than the Vcc MIN level. Thus, more parts should pass timing tests with Vcc MIN w/PSI as the lowest voltage because this voltage is higher than Vcc MIN (without the PSI). Furthermore, the entire waveform 330 may be shifted upwards without exceeding the Vcc MAX specification. In other words, the Vcc MAX w/PSI could be set at the Vcc MAX (without PSI) level without exceeding the voltage limit that was used with the prior art supply. Effectively, the nominal voltage supply value may be set higher, resulting in the Vcc MIN w/PSI being raised even higher, and further improving yield.

Additionally, power consumption may be reduced in the high power consumption mode when compared to the prior art. While the processor is in the high power mode, the supply voltage of the variable voltage supply is set to the low voltage level. Since the processor is tested to meet timing specifications throughout its entire specified supply operating range, the processor still meets the timing specifications. The power consumption, however, may be significantly reduced because the reduction in power when in high power consumption mode is proportional to the square of the voltage difference between prior art nominal value and the Vcc MIN w/PSI. Accordingly, a combination of a circuit having a power status indicator and a variable power supply which adjusts a supply voltage for the circuit may prove quite advantageous.

Figure 4:
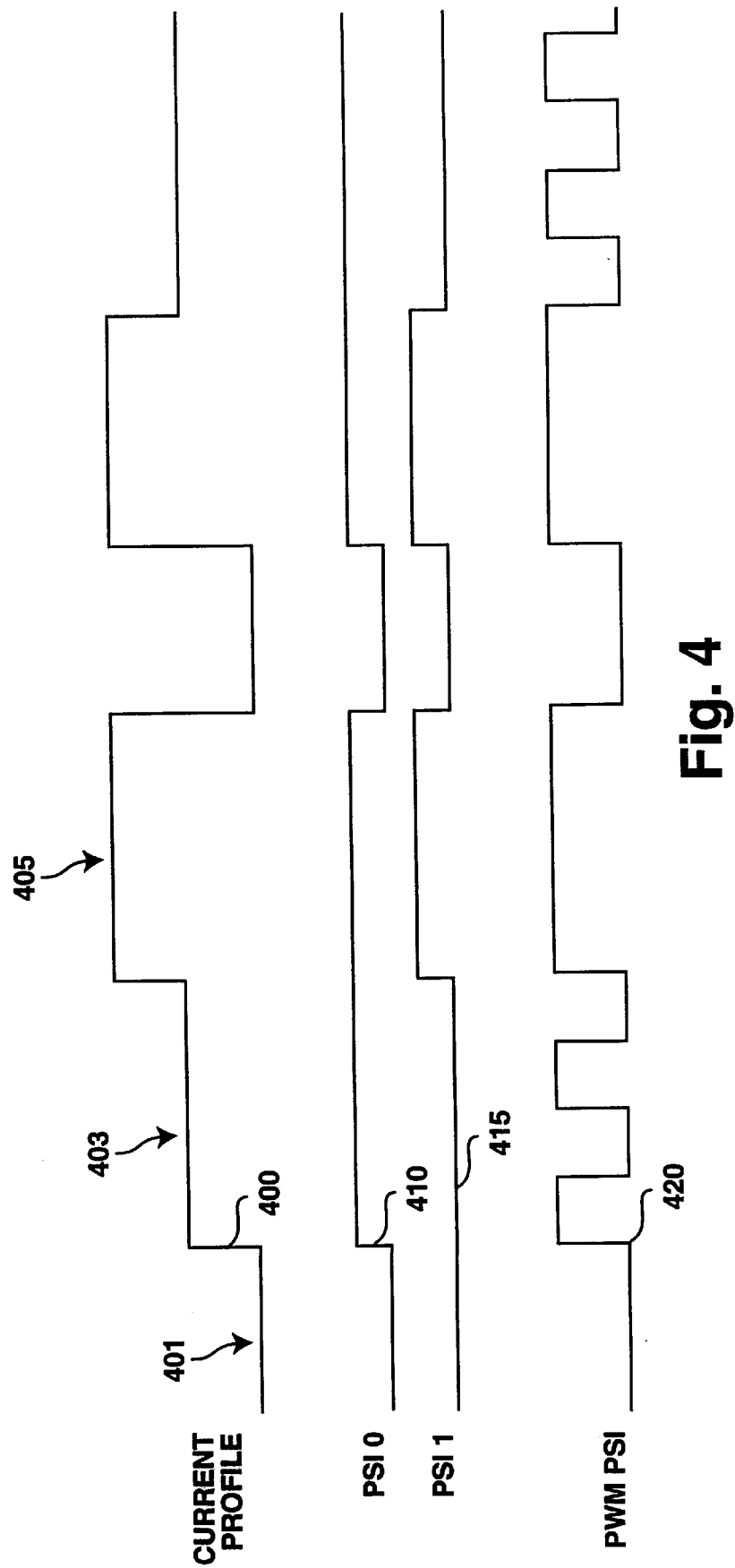
FIG. 4 illustrates two exemplary power status indicator representations for circuits having more than two power consumption modes.

In alternative embodiments, a circuit may operate at numerous power levels (i.e., have numerous power consumption modes), and the power status indicator may indicate the various levels. FIG. 4 illustrates two mechanisms for signaling more than two power consumption modes.

Waveform 400 exhibits an idealized current profile that indicates (by its magnitude) how much power is being consumed by a circuit.

In one embodiment, separate signals PSI1 and PSI0 may be used to indicate in digital form a number corresponding to the current consumption mode. As illustrated, the initial lowest level 401 of the current profile 400 is represented by low logic levels (i.e., logical 0's) on PSI1 and PSI0 (waveforms 410 and 415). An intermediate current consumption level indicated by a portion 403 of the current profile 400 is signaled by the value 01 on PSI1:0, and a high level of current consumption indicated by a portion 405 is signaled by the value 10 on PSI1:0. In alternative embodiments, signal polarities may be changed and additional power status indicator signal lines may be used if needed.

On the other hand, since adding signal lines to a design may be costly, the power consumption mode may be indicated on a single power status signal line using pulse width modulation as indicated by the PWM PSI waveform 420. At the initial lowest level 401 of the current profile 400, the PWM PSI does not toggle and therefore has a zero percent duty cycle. During the portion 403 where the current is at the intermediate level, the PWM PSI signal has a fifty percent duty cycle. Finally, during the high level of current consumption of the portion 405, the PWM PSI signal is maintained at a high logical level. In other embodiments, other encoding techniques or other pulse width modulation representations may be used to encode any number of current consumption modes.

Figure 5:
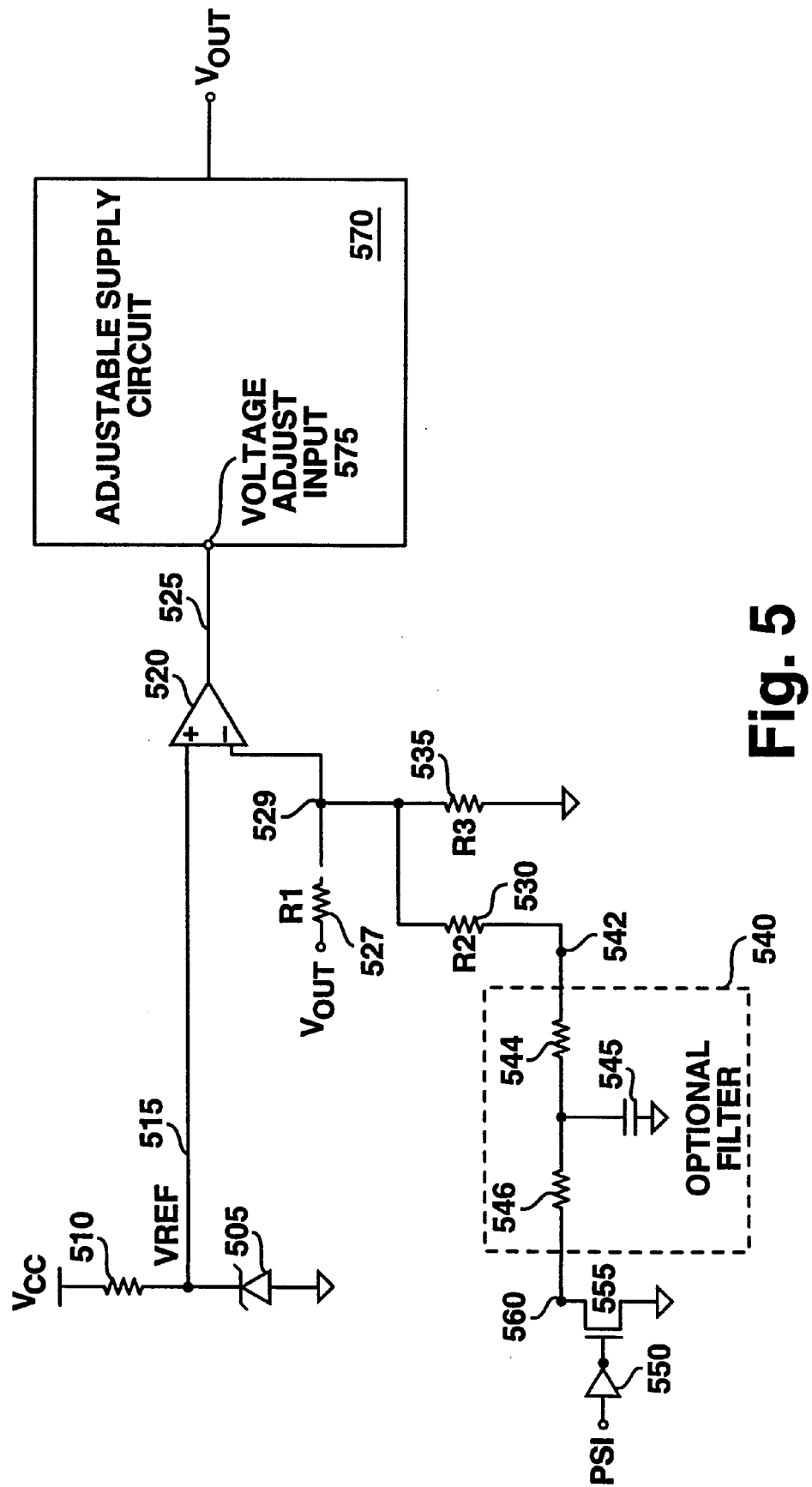
FIG. 5 is an electrical schematic illustrating one embodiment of a variable voltage supply.

FIG. 5 illustrates a variable voltage supply circuit for use with a single power status signal that may convey two or more power consumption modes. In one embodiment, an optional filter 540 may be used, allowing the power status indicator to be a pulse width modulated signal which can indicate numerous power consumption modes as discussed with respect to FIG. 4. In another embodiment, the circuit of FIG. 5 (by omitting the optional filter 540 and connecting nodes 560 and 542) may operate using the single power status indicator discussed with respect to FIGS. 2 and 3.

First, in the case where the optional filter 540 is not used, the variable voltage supply circuit of FIG. 5 may provide a high output voltage or a low output voltage. When the power status indicator (node PSI) is at a low level indicating that the circuit generating that signal is in a low power mode, a transistor 555 is enabled due to an inverter 550 inverting the PSI. The enabled transistor 555 connects a resistor 530 (R2) in parallel with a resistor 535 (R3), thereby providing a resistance less than R3 alone.

The voltage at node 529, the negative input to a comparator 520, is a fraction of Vout determined by a voltage divider formed by a resistor 527 (R1) and either R3 or the parallel combination of R2 and R3 if the power status indicator is low. When the power status indicator transitions to the low value, the voltage at node 529 decreases. The voltage at node 529 is compared by the comparator 520 to a reference voltage (Vref) produced on node 515. A precision voltage supply component, zener diode 505 (e.g., in one embodiment, a National Semiconductor LM4041) and a resistor 510 generate the reference voltage on a signal line 515.

Thus, the voltage at the positive terminal of the comparator 520 is connected to a fixed voltage reference and the voltage at the negative terminal may vary due to variations in Vout according to the power status indicator. When the power status indicator transitions to a low logical level, the comparator 520 drives the node 525 high (Vref is now larger than the voltage at node 529). An adjustable supply circuit 570 receives the value at node 525 at a voltage adjust input 575 and the adjustable supply circuit responsively increases Vout. Thus, the output voltage Vout is driven to a higher voltage level when the PSI indicates that the circuit is operating in a low power consumption mode.

Any power supply circuit which can adjust its output voltage level in response to a signal such as the signal present on node 525 may be used as the adjustable supply circuit 570. Additionally, the adjustable supply circuit may include circuitry similar to the comparator 520 and therefore may take as inputs the reference voltage and a voltage level adjusted according to the power status indicator.

When the PSI transitions to the high logical level, indicating that the circuit is operating in a high power consumption mode, Vout is reduced. First, the transistor 555 is disabled, leaving only R3 and R1 in the voltage divider for Vout. Consequently, the voltage at node 529 is increased, and the comparator drives the node 525 low. The low value at node 525 causes the adjustable supply circuit 570 to reduce Vout.

When the optional filter 540 is employed and the power status indicator is a pulse width modulated signal, a similar process occurs. The filter in the illustrated embodiment is formed by a resistor 546 and a resistor 544 connected in series between nodes 560 and 542 with a capacitor 545 connected to ground between the resistors 544 and 546. With the optional filter 540 in place, the voltage at node 542 is lowest when there is a zero percent duty cycle (PSI always low). As the duty cycle increases, the voltage at node 542 increases as does the voltage at node 529. Consequently, the output voltage (Vout) is reduced as the duty cycle increases, thereby making the variable voltage supply responsive to changes in the power status indicator.

Figure 6:
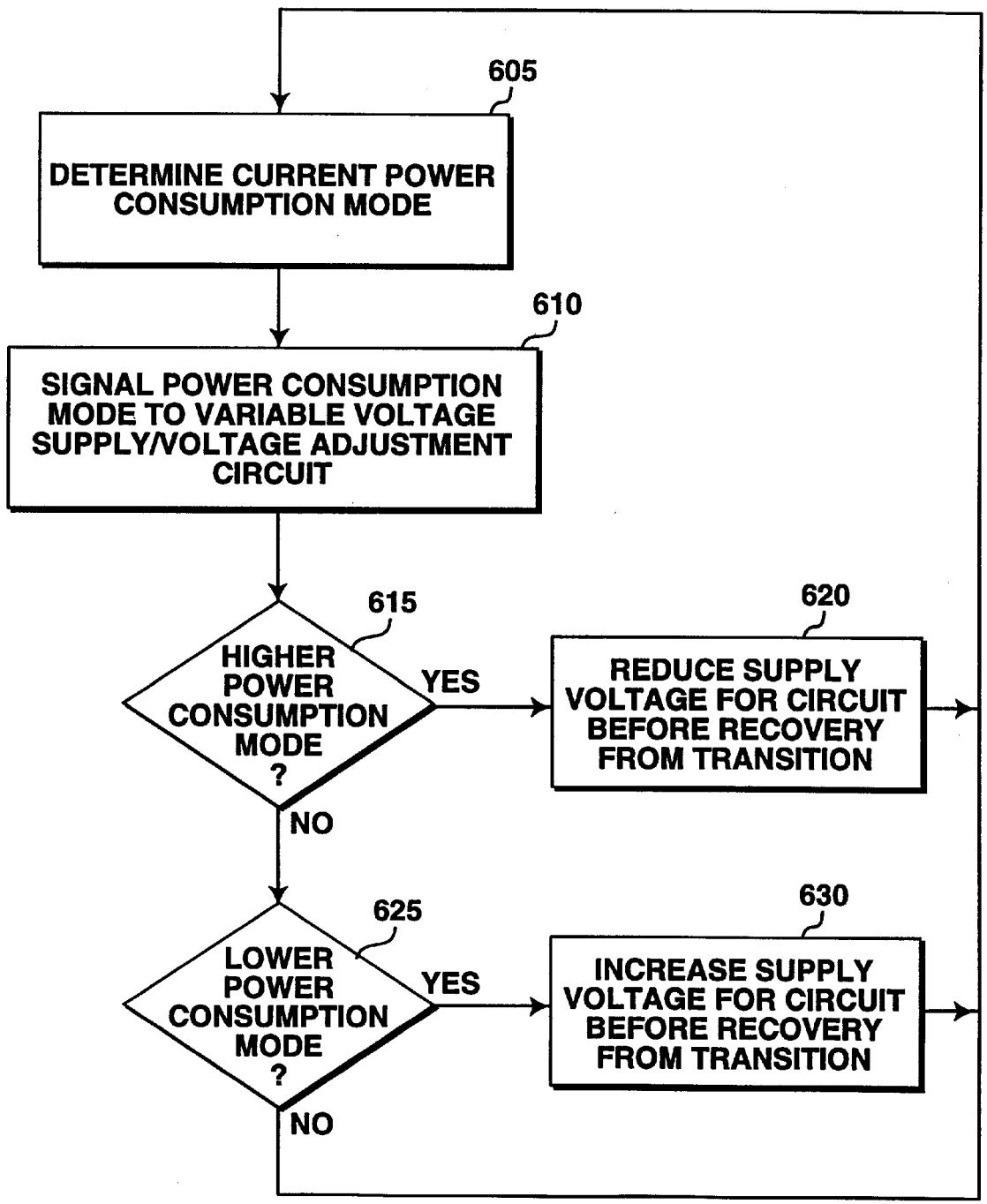
FIG. 6 illustrates one embodiment of a method of providing a variable supply voltage for a circuit having two or more power consumption modes.

FIG. 6 illustrates one embodiment of a method which may be used for adjusting a variable supply voltage for a circuit that may have numerous (or as few as two) power consumption modes. As shown in blocks 605 and 610, the current power consumption mode is determined by the circuit and then signaled to the variable voltage supply or other voltage adjustment circuit.

If the current power consumption mode is a higher power consumption mode than the previous mode, the supply voltage for the circuit is reduced as indicated in blocks 615 and 620. If the current power consumption mode is lower than the previous mode, the supply voltage for the circuit is increased as shown in blocks 625 and 630. As indicated in blocks 620 and 630, the supply voltage may be adjusted before recovery from the current transition so that a narrow operating range may be maintained. As illustrated by FIG. 6 in general, the process of determination of the current power consumption mode and the adjustment of the voltage supply may be continuously occurring. Furthermore any number of separate power consumption modes may be employed using the method of FIG. 6.

In an alternative embodiment, changes in current consumption mode may be signaled in advance of the actual change and supply voltage, allowing adjustments in the supply voltage to be made in advance of the change in power consumption. In this case, adjustments opposite those shown in FIG. 6 may be employed to offset the expected voltage bounce or droop due to the anticipated change in current demand.

Figure 7A:
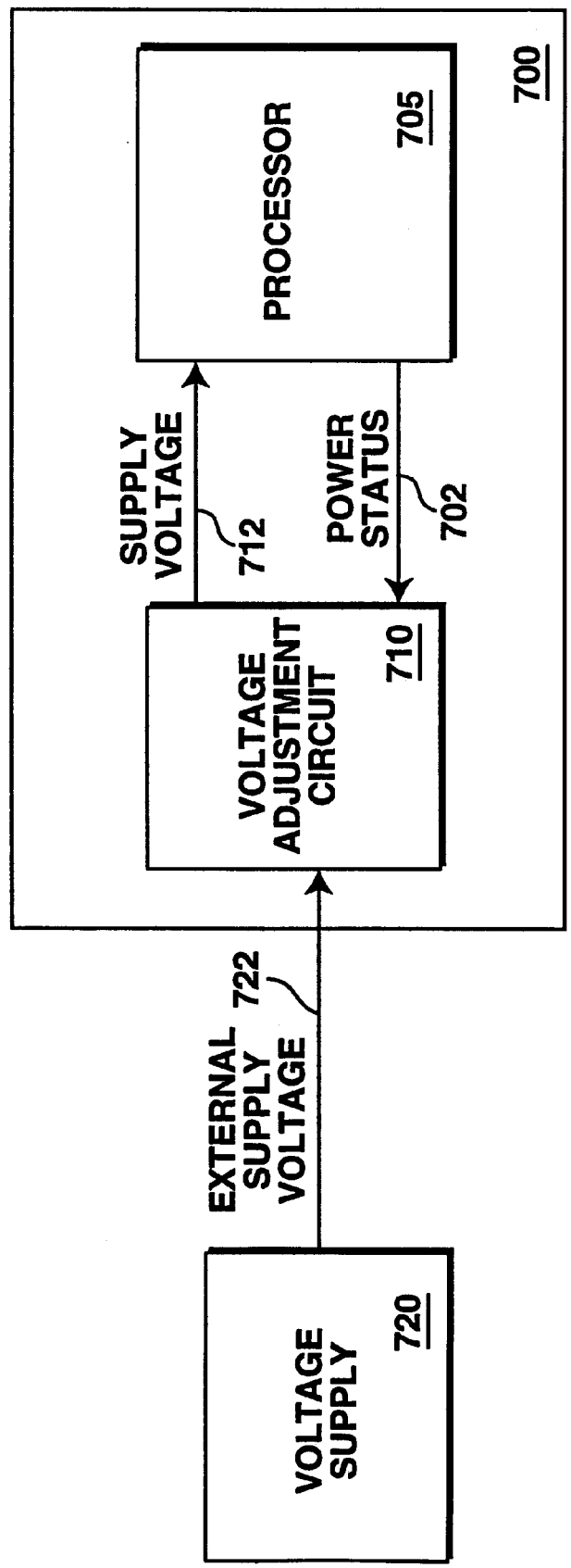
FIG. 7A illustrates one embodiment having an alternative mechanism for providing a supply voltage which is a function of a power status indicator.

FIG. 7A illustrates one alternative voltage supply mechanism for a circuit which generates a power status indicator.

A voltage supply 720 provides an external supply voltage on a voltage supply line 722 to a processor unit 700. Adjustments to the external supply voltage may then be made within the processor unit 700. The processor unit 700 may be a single integrated circuit or it may be a module which houses two or more integrated circuits.

The processor unit 700 includes a voltage adjustment circuit 710 and a processor 705. The processor 705 generates a power status signal on a signal line 702 for the voltage adjustment circuit 710. The voltage adjustment circuit 710 rather than the voltage supply 720 varies the supply voltage which is supplied to the processor on the supply line 712. In this embodiment, the external supply voltage may be routed to a number of components such as other processor units, allowing the external voltage to be adjusted internally for each unit.

Figure 7B:
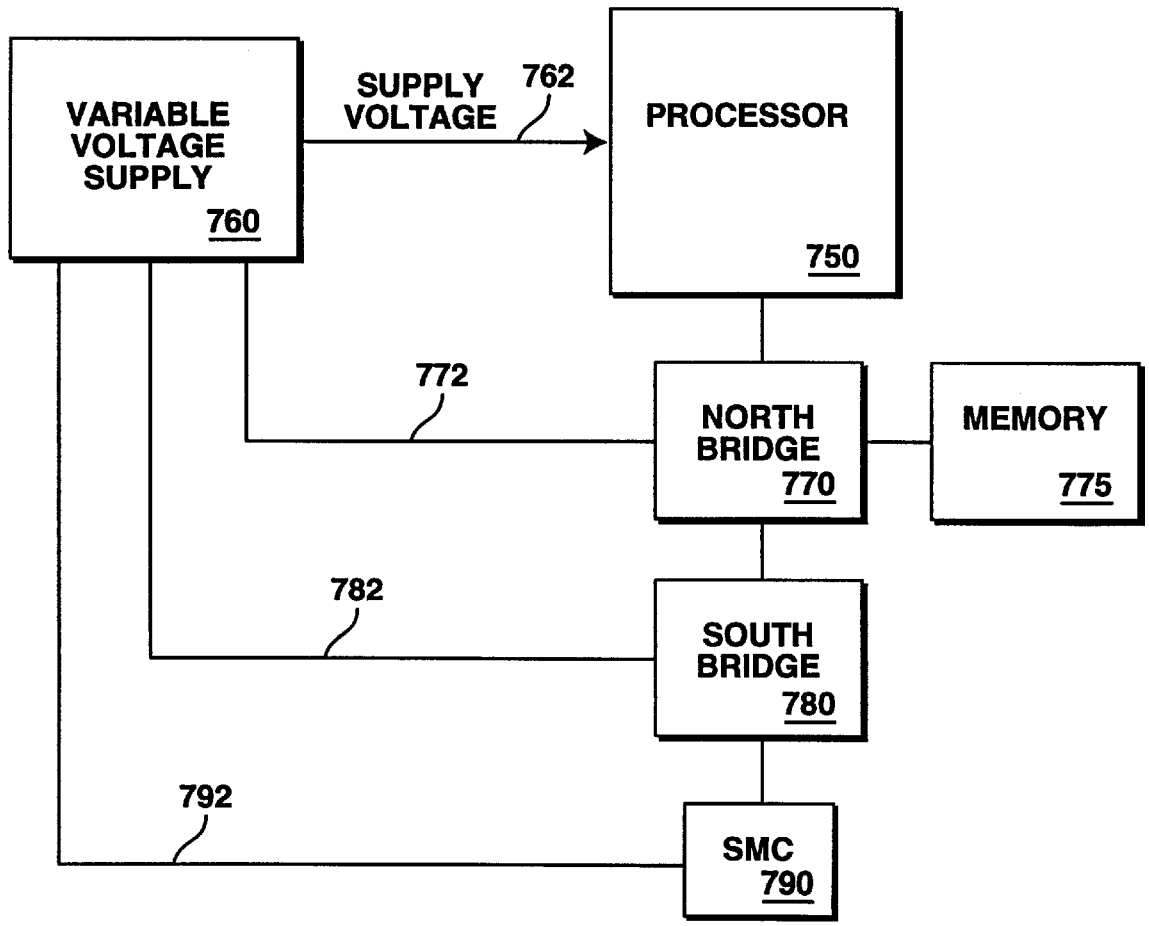
FIG. 7B illustrates an alternative mechanism for indicating the power consumption mode of a circuit to a variable voltage supply.

FIG. 7B illustrates several mechanisms which may be used to indicate the power consumption mode of a processor 750 to a variable voltage supply 760. Notably, only one of the three mechanism illustrated in FIG. 7B may be necessary to signal the power consumption mode to the variable voltage supply 760 in a particular embodiment. The processor 750 may issue a special bus cycle containing power consumption mode information which is recognized by a north bridge circuit 770. In this embodiment, the north bridge circuit 770 (which also communicates with a memory 775 and a south bridge circuit 780) signals the power consumption mode indicated by the bus cycle from the processor 750 via a signal line 772 connected to the variable voltage supply 760. The variable voltage adjusts the supply voltage provided to the processor 750 on the supply line 762 in response to the power consumption mode. This embodiment avoids the use of a dedicated signal pin for the power status indicator on the processor 750.

One alternative is for the processor to issue a bus cycle which will be passed by the north bridge circuit 770 to the south bridge circuit 780. The south bridge circuit 780 then can pass power consumption mode information from the bus cycle to the variable voltage supply 760 on a signal line 782, again eliminating the use of a dedicated pin on the processor 750 for the power status indicator. Finally, the processor 750 may generate a command for a system management controller (SMC) 790. The command to the SMC 790 may indicate the power consumption mode, and the SMC passes this information to the variable voltage supply 760 via a signal line 792.

As shown, a variety of mechanisms may be used to signal the power consumption mode of a circuit such as the processor 750. Some solutions may eliminate the need for a dedicated interface pin on the processor 750; however, the ability to use these solutions may depend on the time delay through other components such as the north bridge circuit 770, the south bridge circuit 780, and the SMC 790.

A number of embodiments of an integrated circuit power status indicator and method of using the same have been disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
    a circuit capable of generating a power status signal indicating a power consumption mode in which the circuit operates; and
    a variable voltage supply coupled to receive the power status signal and, in response to the power status signal, to provide to the circuit a supply voltage which is a function of the power status signal.

2. The apparatus of claim 1 wherein the power consumption mode indicated by the power status signal is a current power consumption mode in which the circuit is currently operating.

3. The apparatus of claim 2 wherein a change in the power consumption mode causes a voltage bounce or a voltage droop on the supply voltage and the variable voltage supply adjusts the supply voltage before the supply voltage recovers from the bounce or droop.

4. The apparatus of claim 1 wherein the circuit has a first power consumption mode and a second power consumption mode and wherein the variable voltage supply is coupled to provide a first supply voltage when the power status signal indicates the first power consumption mode and to provide a second supply voltage when the power status signal indicates the second power consumption mode.

5. The apparatus of claim 4 wherein the first power consumption mode is a high power consumption mode, the first supply voltage is a low supply voltage, the second power consumption mode is a low power consumption mode, and the second supply voltage is a high supply voltage.

6. The apparatus of claim 2 wherein the circuit has a plurality of power consumption modes and wherein the variable voltage supply increases the supply voltage when the power status signal indicates that the circuit has entered a lower power consumption mode and wherein the variable voltage supply decreases the supply voltage when the power status signal indicates that the circuit has entered a lower power consumption mode.

7. The apparatus of claim 1 wherein the power status signal utilizes pulse width modulation to indicate the power consumption mode of the circuit.

8. The apparatus of claim 1 wherein the circuit is an integrated circuit, the variable voltage supply is a separate component, and further wherein the power status signal is transmitted from the integrated circuit to the variable voltage supply by at least one signal line.

9. The apparatus of claim 8 wherein the integrated circuit is a processor.

10. The apparatus of claim 1 wherein the circuit and the variable voltage supply form a single component.

11. The apparatus of claim 10 wherein the variable voltage supply is a voltage adjustment circuit which is coupled to receive an external supply voltage and to adjust the external supply voltage according to the power status signal to generate the supply voltage.

12. An integrated circuit comprising:
    at least one functional unit;
    a control unit capable of operating the at least one functional unit in one of a plurality of power consumption modes;
    a power status indicator circuit coupled to the control unit and capable of generating a power status signal for a variable voltage supply, the power status signal indicating which one of the plurality of power consumption modes is a current power consumption mode; and
    a power supply input coupled to receive a supply voltage from the variable voltage supply, the supply voltage being adjusted in response to the power status signal.

13. The integrated circuit of claim 12 wherein the integrated circuit has a single output pin for the power status signal.

14. The integrated circuit of claim 13 wherein the power status signal is a pulse width modulated signal.

15. The integrated circuit of claim 12 wherein integrated circuit includes as an integral portion of the integrated circuit a voltage adjustment circuit which is a part of the variable voltage supply.

16. A method comprising:

signaling a power consumption mode for a circuit to a variable voltage supply; and adjusting a supply voltage to a different target supply voltage level for the circuit when a change in the power consumption mode is signaled to the variable voltage supply.

17. The method of claim 16 wherein adjusting the supply voltage further comprises:

adjusting the power supply to supply the different target supply voltage level prior to the supply voltage recovering from a voltage excursion caused by the change in the power consumption modes.

18. The method of claim 16 wherein adjusting further comprises:

reducing the supply voltage if the power consumption mode changes to a higher power consumption mode; and increasing the supply voltage if the power consumption mode changes to a lower power consumption mode.

19. The method of claim 16 wherein adjusting further comprises:

providing a low supply voltage when the power consumption mode is a high power consumption mode; and providing a high supply voltage when the power consumption mode is a low power consumption mode.

20. The method of claim 19 wherein signaling further comprises generating a power status signal that is a pulse width modulated signal.

21. An apparatus comprising:

a circuit having a means for indicating a power consumption mode in which the circuit operates; and means for supplying a supply voltage that is a function of the power consumption mode of the circuit, the means for supplying being coupled to the means for indicating the power consumption mode of the circuit, and adjusting the power supply voltage responsive to the means for indicating the power consumption mode.

22. The apparatus of claim 21 wherein the circuit is a processor.

23. A variable voltage supply for supplying a variable voltage to an integrated circuit, comprising:

a power status input coupled to receive a power status signal, the power status signal indicating at least whether the integrated circuit is operating in a high power mode or a low power mode;

an adjustable supply circuit coupled to receive the power status signal and to provide an output voltage which is a lower output voltage for the integrated circuit if the integrated circuit is in the high power mode and which is a higher output voltage for the integrated circuit if the integrated circuit is in the low power mode.

24. The variable voltage supply of claim 23 wherein the variable voltage supply circuit further comprises:

a voltage reference element;

a voltage divider element comprising:

a first resistor having a first resistor first terminal coupled to receive the output voltage and a first resistor second terminal coupled to a voltage divider node;

a second resistor having a second resistor first terminal coupled to the voltage divider node and a second resistor second terminal coupled to a voltage supply line;

a voltage comparator circuit coupled having a first input coupled to the voltage reference element and a second input coupled to the voltage divider node, the voltage comparator circuit providing to the adjustable supply circuit a signal which causes the adjustable supply circuit to provide the higher output voltage or the lower output voltage depending on the power status signal; and a third resistor having a third resistor first terminal coupled to the voltage divider node; and a transistor controlled by the power status signal to enable a path from a third resistor second terminal to the voltage supply line.

* * * * *